(12) United States Patent
Yacoub

(10) Patent No.: US 7,917,364 B2
(45) Date of Patent: Mar. 29, 2011

(54) SYSTEM AND METHOD USING MULTIPLE AUTOMATED SPEECH RECOGNITION ENGINES

(75) Inventor: Sherif Yacoub, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1991 days.

(21) Appl. No.: 10/668,141

(22) Filed: Sep. 23, 2003

(65) Prior Publication Data
US 2005/0065790 A1  Mar. 24, 2005

(51) Int. Cl.
*G10L 15/04* (2006.01)
(52) U.S. Cl. ........ 704/251; 704/231; 704/246; 704/247; 704/252
(58) Field of Classification Search .................. 704/246, 704/251
See application file for complete search history.

(56) References Cited

U.S. PATENT DOCUMENTS

| | | | | |
|---|---|---|---|---|
| 4,641,342 A * | 2/1987 | Watanabe et al. | | 704/253 |
| 6,122,613 A * | 9/2000 | Baker | | 704/235 |
| 6,484,145 B1 * | 11/2002 | Horne et al. | | 705/8 |
| 6,728,671 B1 * | 4/2004 | Johnson | | 704/231 |
| 6,766,295 B1 * | 7/2004 | Murveit et al. | | 704/243 |
| 6,798,786 B1 * | 9/2004 | Lo et al. | | 370/468 |
| 6,975,993 B1 * | 12/2005 | Keiller | | 704/275 |
| 7,058,573 B1 * | 6/2006 | Murveit et al. | | 704/229 |
| 7,184,957 B2 * | 2/2007 | Brookes et al. | | 704/246 |
| 7,228,275 B1 * | 6/2007 | Endo et al. | | 704/235 |
| 7,570,587 B1 * | 8/2009 | Wilson et al. | | 370/230 |
| 2002/0019234 A1 * | 2/2002 | Wright et al. | | 455/450 |
| 2002/0193991 A1 * | 12/2002 | Bennett et al. | | 704/247 |
| 2003/0105623 A1 * | 6/2003 | Cyr et al. | | 704/201 |
| 2003/0236664 A1 * | 12/2003 | Sharma | | 704/251 |
| 2004/0138885 A1 * | 7/2004 | Lin | | 704/240 |
| 2004/0244001 A1 * | 12/2004 | Haller et al. | | 718/100 |
| 2005/0044228 A1 * | 2/2005 | Birkestrand et al. | | 709/226 |

* cited by examiner

*Primary Examiner* — Leonard Saint Cyr

(57) ABSTRACT

A system comprises a computer system comprising a central processing unit coupled to a memory and resource management application. A plurality of different automatic speech recognition (ASR) engines is coupled to the computer system. The computer system is adapted to select ASR engines to analyze a speech utterance based on resources available on the system.

14 Claims, 3 Drawing Sheets

SYSTEM AND METHOD USING MULTIPLE AUTOMATED SPEECH RECOGNITION ENGINES

BACKGROUND

Automated speech recognition (ASR) engines enable people to communicate with computers. Computers implementing ASR technology can recognize speech and then perform tasks without the use of additional human intervention.

ASR engines are used in many facets of technology. One application of ASR occurs in telephone networks. These networks enable people to communicate over the telephone without operator assistance. Such tasks as dialing a phone number or selecting menu options can be performed with simple voice commands.

ASR engines have two important goals. First, the engine must accurately recognize the spoken words. Second, the engine must quickly respond to the spoken words to perform the specific function being requested. In a telephone network, for example, the ASR engine has to recognize the particular speech of a caller and then provide the caller with the requested information.

Systems and networks that utilize a single ASR engine are challenged to recognize accurately and consistently various speech patterns and utterances. A telephone network, for example, must be able to recognize and decipher between an inordinate number of different dialects, accents, utterances, tones, voice commands, and even noise patterns, just to name a few examples. When the network does not accurately recognize the speech of a customer, processing errors occur. These errors can lead to many disadvantages, such as unsatisfied customers, dissemination of misinformation, and increased use of human operators or customer service personnel.

SUMMARY

In one embodiment, a method of automatic speech recognition (ASR) comprises: receiving a speech utterance from a user; assessing resources of a plurality of different ASR engines; assigning the speech utterance to a single ASR engine if assessing resources is above a threshold value; assigning the speech utterance to a plurality of different ASR engines if assessing resources is below a threshold value; and generating text of the speech utterance with either the single ASR engine or plurality of ASR engines.

In another embodiment, a system comprises a computer system comprising a central processing unit coupled to a memory and resource management application. A plurality of different automatic speech recognition (ASR) engines is coupled to the computer system. The computer system is adapted to select ASR engines to analyze a speech utterance based on resources available on the system.

Other embodiments and variations of these embodiments are shown and taught in the accompanying drawings and detailed description.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
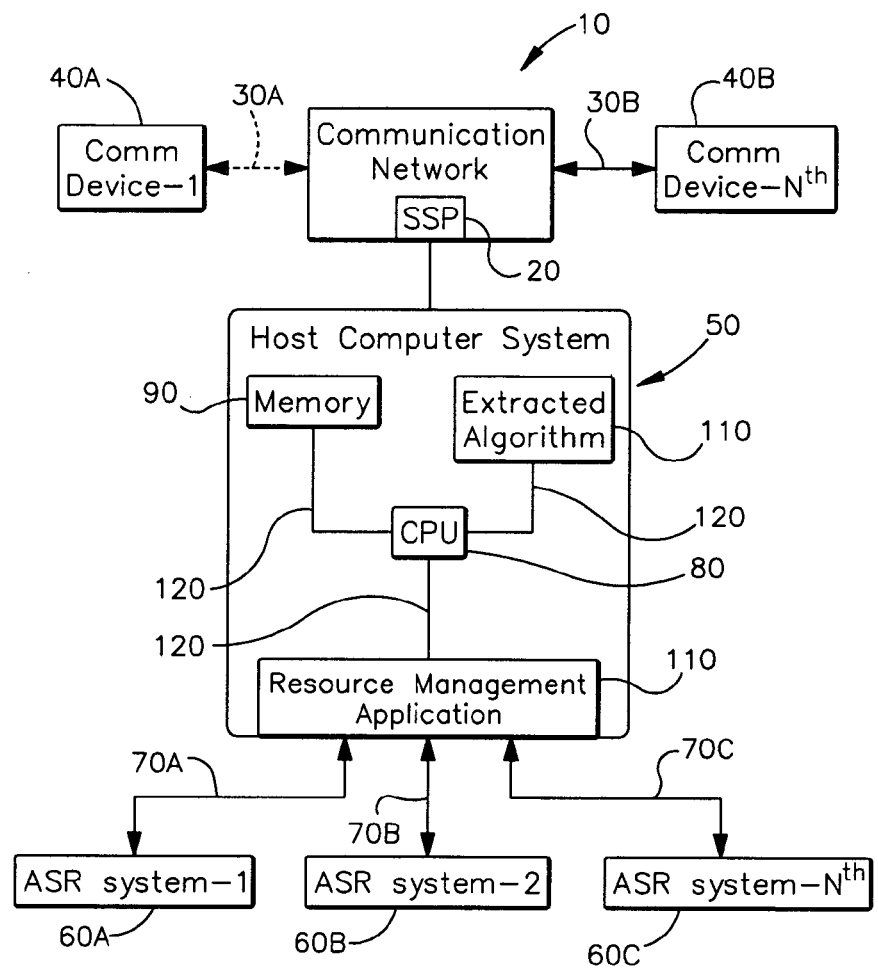
FIG. 1 is a block diagram of an example system in accordance with an embodiment of the present invention.

Embodiments in accordance with the present invention are directed to automatic speech recognition (ASR) systems and methods. These embodiments may be utilized with various systems and methods that use ASR and interactive voice response (IVR) systems. FIG. 1 illustrates one such exemplary embodiment.

FIG. 1 illustrates a communication network 10 utilizing an IVR system. Network 10 may be any one of various communication networks that utilize ASR, such as a voice telephone system, voice enabled banking, voice-driven mailboxes, voice driven browsers (such as airline IVR systems) or other IVR system. For illustration, a voice telephone system is described. Network 10 generally comprises a plurality of switching service points (SSP) 20 and telecommunication pathways 30A, 30B that communicate with communication devices 40A, 40B. The SSP may, for example, form part of a private or public telephone communication network. FIG. 1 illustrates a single switching service point, but a private or public telephone communication network can comprise a multitude of interconnected SSPs.

The SSP 20 can be any one of various configurations known in the art, such as a distributed control local digital switch or a distributed control analog or digital switch, such as an ISDN switching system.

The network 10 is in electronic communication with a multitude of communication devices, such as communication device-1 (shown as 40A) to communication device-Nth (shown as 40B). As one example, the SSP 20 could connect to one communication device via a land-connection. In another example, the SSP could connect to a communication device via a mobile or cellular type connection. Many other types of connections (such as internet, radio, and microphone interface connections) are also possible.

Communication devices 40 may have many embodiments. For example, device 40B could be a land phone, and device 40A could be a cellular phone. Alternative, these devices could be any other electronic device adapted to communicate with the SSP, an IVR system, or an ASR engine. Such devices would comprise, for example, a personal computer, a microphone, a public telephone, a kiosk, or a personal digital assistant (PDA) with telecommunication capabilities.

The communication devices are in communication with the SSP 20 and a host computer system 50. Incoming speech is sent from the communication device 40 to the network 10. The communication device transforms the speech into electrical signals and converts these signals into digital data or input signals. This digital data is sent through the host computer system 50 to one of a plurality of ASR systems or engines 60A, 60B, 60C, wherein each ASR system 60 is preferably different (as described below). As shown, a multitude of different ASR systems or engines can be used with the present invention, such as ASR system-1 to ASR system-Nth.

The ASR systems (described in detail in FIG. 2 below) are in communication with host computer system 50 via data buses 70A, 70B, 70C. Host computer system 50 comprise a processor or central processing unit (CPU) 80 for controlling the overall operation of the computer, memory 90 (such as random access memory (RAM) for temporary data storage and read only memory (ROM) for permanent data storage), a non-volatile data base 100 for storing control programs and other data associated with host computer system 50, and resource management application 110. The CPU communicates with memory 90, data base 100, resource management application 110, and many other components (such as input/output (I/O) interface devices or display devices) via buses 120.

FIG. 1 shows a simplified block diagram of a voice telephone system. As such, the host computer system 50 would be connected to a multitude of other devices and would include, by way of example, input/output (I/O) interfaces to provide a flow of data from local area networks (LAN), supplemental data bases, and data service networks, all connected via telecommunication lines and links.

Figure 2:
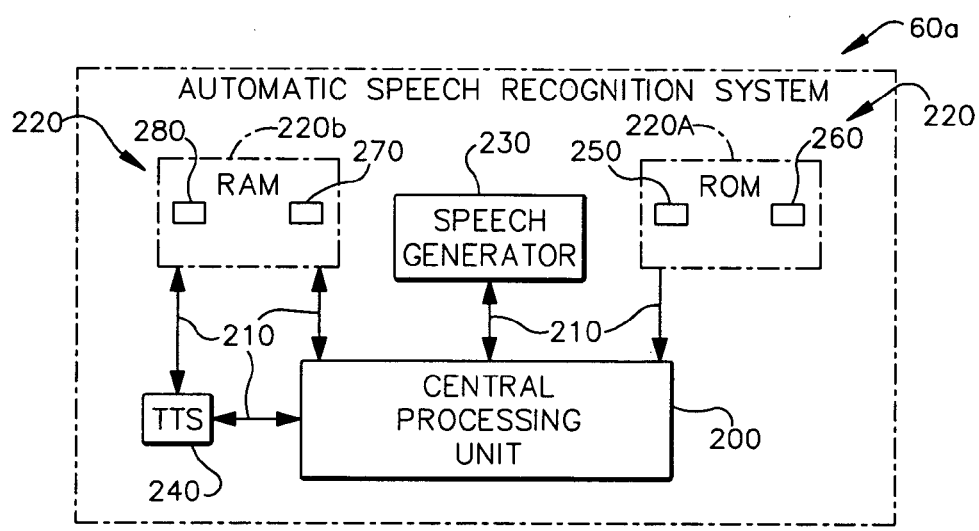
FIG. 2 illustrates an automatic speech recognition (ASR) engine.

FIG. 2 shows a simplified block diagram of an exemplary embodiment of an ASR system 60A that can be utilized with embodiments of the present invention. Since various ASR systems are known, FIG. 2 illustrates one possible system. The ASR system could be adapted for use with either speaker independent or speaker dependent speech recognition techniques. The ASR system generally comprises a CPU 200 for controlling the overall operation of the system. The CPU has numerous data buses 210, memory 220 (including ROM 220A and RAM 220B), speech generator unit 230 for communicating with participants, and a text-to-speech (TTS) system 240. System 240 may be adapted to transcribe written text into a phoneme transcription, as is known in the art.

As shown in FIG. 2, memory 220 connects to CPU and provides temporary storage of speech data, such as words spoken by a participant or caller from communication devices 40. The memory can also provide permanent storage of speech recognition and verification data that includes a speech recognition algorithm and models of phonemes. In this exemplary embodiment, a phoneme based speech recognition algorithm could be utilized, although many other useful approaches to speech recognition are known in the art. The system may also include speaker dependent templates and speaker independent templates.

A phoneme is a term of art that refers to one of a set of smallest units of speech that can be combined with other such units to form larger speech segments, example morphemes. For example, the phonetic segments of a single spoken word can be represented by a combination of phonemes. Models of phonemes can be compiled using speech recognition class data that is derived from the utterances of a sample of speakers belonging to specific categories or classes. During the compilation process, words selected so as to represent all phonemes of the language are spoken by a large number of different speakers.

In one type of ASR system, the written text of a word is received by a text-to-speech unit, such as TTS system 240, so the system can create a phoneme transcription of the written text using rules of text-to-speech conversion. The phoneme transcription of the written text is then compared with the phonemes derived from the operation of a speech recognition algorithm 250. The speech recognition algorithm, in turn, compares the utterances with the models of phonemes 260. The models of phonemes can be adjusted during this "model training" process until an adequate match is obtained between the phoneme derived from the text-to-speech transcription of the utterances and the phonemes recognized by the speech recognition algorithm 250.

Models of phonemes 260 are used in conjunction with speech recognition algorithm 250 during the recognition process. More particularly, speech recognition algorithm 250 matches a spoken word with established phoneme models. If the speech recognition algorithm determines that there is a match (i.e. if the spoken utterance statistically matches the phoneme models in accordance with predefined parameters), a list of phonemes is generated.

Embodiments in accordance with the present invention can be adapted, for example, to use either or both speaker independent recognition techniques or speaker dependent recognition techniques. Speaker independent techniques can comprise a template 270 that is a list of phonemes representing an expected utterance or phrase. The speaker independent template 216, for example, can be created by processing written text through TTS system 240 to generate a list of phonemes that exemplify the expected pronunciations of the written word or phrase. In general, multiple templates are stored in memory 220 to be available to speech recognition algorithm 250. The task of algorithm 250 is to choose which template most closely matches the phonemes in a spoken utterance.

Speaker dependent techniques can comprise a template 280 that is generated by having a speaker provide an utterance of a word or phrase, and processing the utterance using speech recognition algorithm 250 and models of phonemes 260 to produce a list of phonemes that comprises the phonemes recognized by the algorithm. This list of phonemes is speaker dependent template 280 for that particular utterance.

During real time speech recognition operations, an utterance is processed by speech recognition algorithm 250 using models of phonemes 260 such that a list of phonemes is generated. This list of phonemes is matched against the list provided by speaker independent templates 270 and speaker dependent templates 280. Speech recognition algorithm 250 reports results of the match.

Example embodiments in accordance with the present invention provide a method and a system to improve speech recognition accuracy in speech-driven applications by maximizing the runtime utilization of available system resources. Embodiments may also utilize a combination technology for multiple speech recognition engines. As noted, the system and method may be used in applications that employ speech recognition technologies (such as ASR or IVR systems) as a mean to capture and recognize user input, such as speech utterances. The invention improves the recognition rate and accuracy with no penalty in response times and without any noticeable slowdown for the user.

Systems and methods of the present invention may dynamically utilize multiple ASR engines to recognize a speech utterance if resources are available. If, however, the system is busy (for example, serving many users), only one ASR engine is used to recognize the speech utterance. If system resources are available (for example, only few users are using the system), multiple ASR engines can be used and their results combined. Hence, the system provides dynamic accuracy based on available resources of the system.

Figure 3:
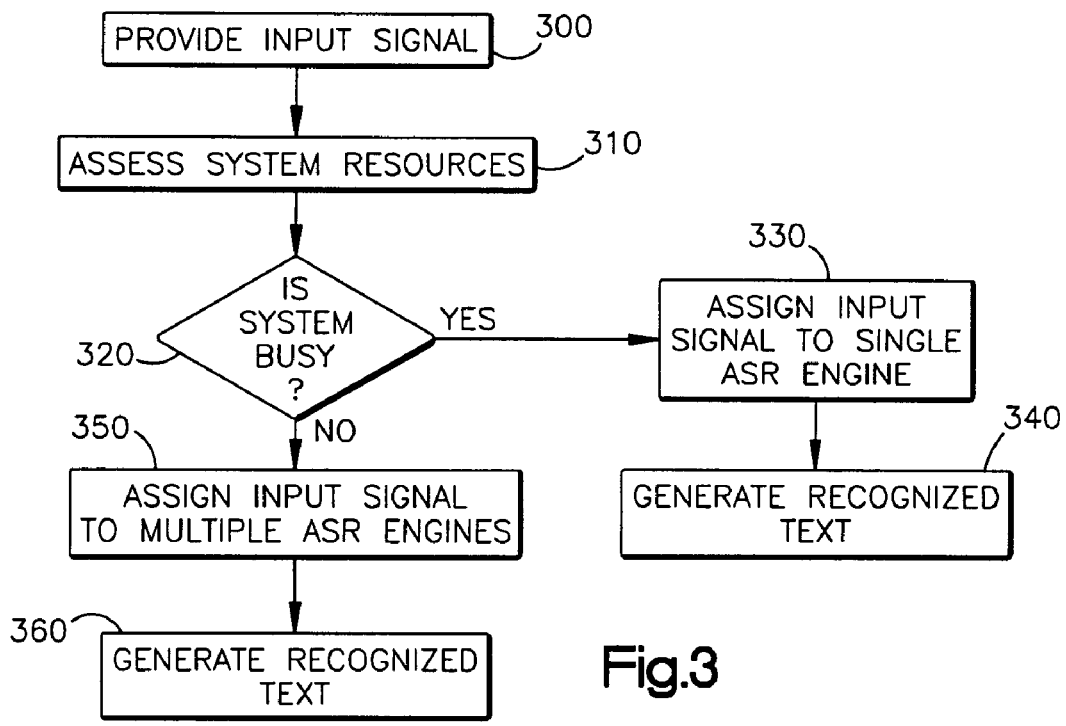
FIG. 3 illustrates a flow diagram of a method in accordance with an embodiment of the present invention.

FIG. 3 is a flow diagram describing the actions of one example embodiment. For illustration, a communication network or system (such as an IVR system) is shown. As an example of one embodiment of the present invention, the method is described in connection with FIG. 1. Assume that a participant or user (such as a telephone caller) telephones or otherwise establishes communication between communication device 40 and communication network 10. Per block 300, the communication device provides communication network 10 with an electronic input signal in a digital format.

Per block 310, the host computer 50 assesses the resources of the system. At this stage, for example, ports of different ASR engines 60, memory 90, database 100, or processing power of CPU 80 can be evaluated for availability. As discussed in more detail below, many other factors can be utilized to assess the resources of the system or availability of each ASR engine or combination of ASR engines.

Per block 320, a determination is made: Is the system busy?

Per block 330, if the system is busy, the host computer 50, in cooperation with the resource management application 110, assigns the input signal to a single ASR engine. Per block 340, the assigned ASR engine generates recognized text for the input signal.

On the other hand, per block 350, if the system is not busy, the host computer, in cooperation with the resource management application 110, assigns the input signal to multiple ASR engines. Per block 360, the assigned ASR engines generate recognized text for the input signal. Here, the recognized text from the selected ASR engines can be combined. This combination can yield more accurate recognized text when compared to a single ASR engine.

Embodiments of the present invention can utilize various ASR engines or systems. By way of example only, ASR1 engine could be a Speechworks engine; ASR2 could be the Nuance engine; ASR3 could be the Sphinx engine from Carnegie Mellon University; ASR4 could be a Microsoft engine; and ASR5 could be the Summit engine from Massachusetts Institute of Technology. As noted, multiple engines can be combined to generate recognized text as well. The ASR engines used in the invention do not necessarily mean that the engines are produced from different or distinct vendors. For example, the same ASR engine from one commercial vendor could be modified to perform best for specific type of input signal, and hence this modified ASR engine could be considered another engine as per this invention.

As noted, if the system is not busy, then the input signal is assigned to multiple ASR engines. In an alternative embodiment, the host computer system 50 could instead select the best ASR system 60 based on the type or category of input signal. The best ASR system 60 suitable for the specific category of input signal is selected from a plurality of available systems 60A-60Nth. In other words, a specific ASR system is selected that has the best performance or best accuracy (example, the least Word Error Rate (WER)) for the particular type of input signal (i.e., particular type of utterance of the participant).

The system thus utilizes a method to intelligently select an ASR engine or combination of ASR engines from a multiplicity of ASR engines at runtime. The system has the ability to implement a dynamic selection method. In other words, the selection of a particular ASR engine or combination of ASR engines is preferably based upon availability and usage of system resources. As such, the system is dynamic since it changes or adapts to meet particular availabilities or capabilities of the system itself.

Figure 4:
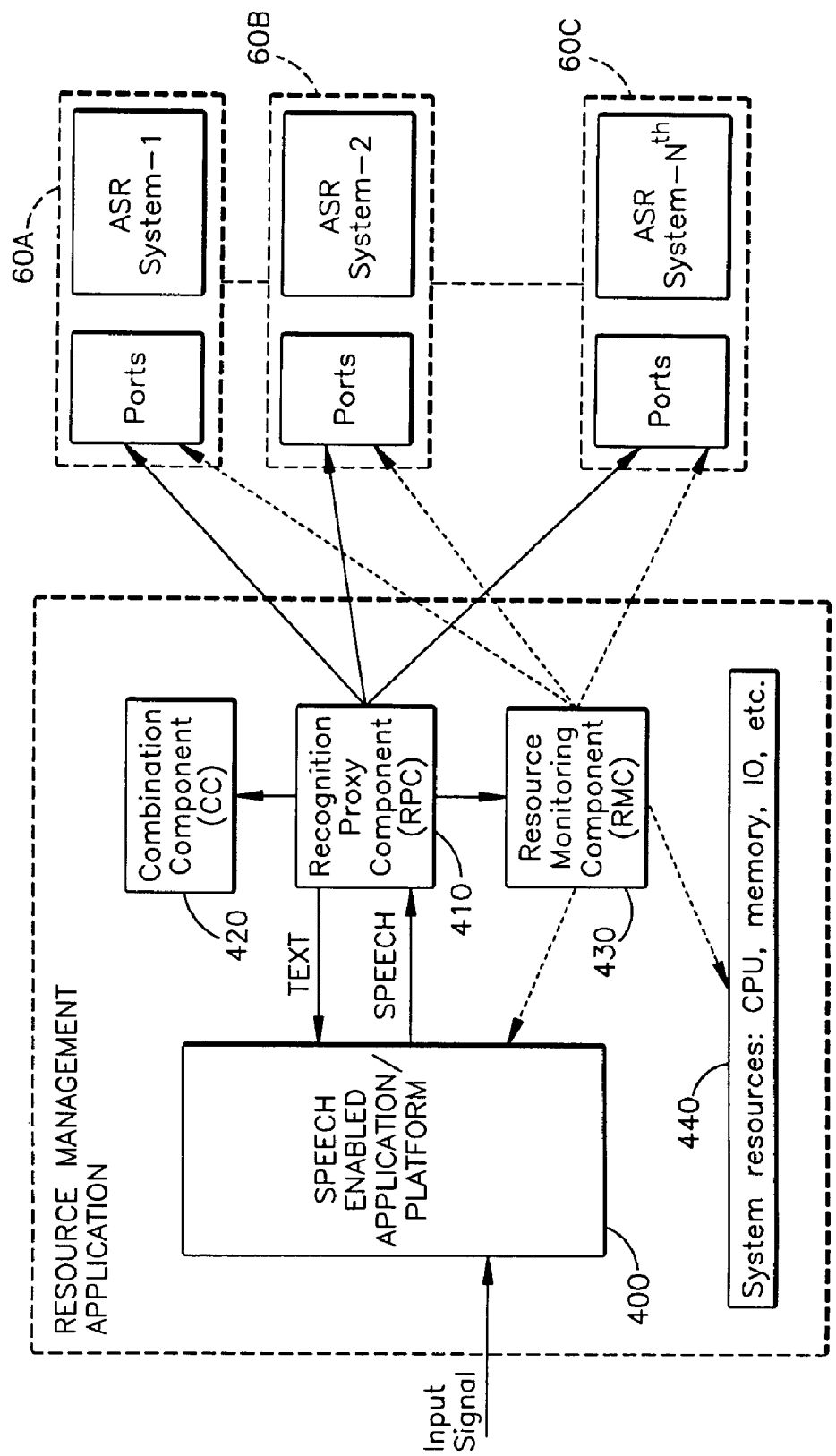
FIG. 4 illustrates a block diagram of a speech-driven application having a Resource Management Application in accordance with an embodiment of the present invention.

Looking to FIG. 4, a speech driven or enabled application having the resource management application is shown in more detail. As shown, a user input signal (such as a speech utterance) is provided into a speech enabled application or platform 400. The speech enabled application may be an off-the-shelf type application, such as a platform that Hewlett-Packard offers entitled "OpenCall Media Platform." Embodiments of the present invention are usable with multiple types of speech-enabled applications. As part of the application processing workflow, the application preferably recognizes the speech spoken by the user in order to take actions accordingly, such as retrieving database records, text matching, etc.

For IVR systems, ASR engines may be utilized on a different machine than one handling user interactions, call controls, and the speech enabled application. Speech recognition may be a CPU and memory intensive operation that is performed on a separate machine. An ASR engine provides support for handling multiple recognition channels (ports) at the same time. Each port may be serving one user at a time. Further, the number of ports may be restricted by the processing power and resources of the recognition machine.

Multiple ASR engine types (even from different vendors) may be used to improve the recognition accuracy through combination. Different ASR engine types could run on the same machine or on multiple distributed machines. FIG. 4 illustrates one embodiment where each ASR engines 60A, 60B, 60C are each deployed on a separate machine.

When a user provides an input signal (i.e., talks to the system), the input speech signal is communicated from the speech enabled application 400 to a recognition proxy component 410. The recognition proxy component (RPC) 410 is in communication with or is coupled to a combination component (CC) 420 and a resource monitoring component (RMC) 430.

RMC 430 monitors the utilization of resources in the system. RMC 430 collects information about available resources, analyzes the collected information, and makes a decision about which ASR engine or combination of ASR engines can be used at a certain time. RMC 430 can monitor many different resources. By way of example, these resources include, but are not limited to, ASR ports, system resources, and call handlers.

For ASR ports, RMC 430 monitors or evaluates the port utilization of each ASR engine type. Based on the number of available ports for each ASR engine type, the RMC makes a decision about which ASR engines are available for use for an input speech signal at a given instance of time.

For system resources, RMC 430 monitors or evaluates the resource availabilities, capabilities, and utilization of the system on which the speech enabled application executes. FIG. 4 shows examples of these system resources at 440. Resources include, for example, CPU utilization (available processing power), memory utilization (free memory), input/output (I/O) usage and capabilities.

For call handlers, RMC 430 also monitors and evaluates information about the number of users connected to the system at any point in time by connecting to the call control unit of the speech enabled platform.

Based on information collected from various system resources, RMC 430 makes a recommendation about which ASR engines can be used. For that purpose, the RMC can implement various decision-making strategies. The following examples illustrate two such decision-making strategies. These strategies are provided as examples and should not be construed to limit other decision-making strategies applicable with embodiments of the present invention. Further, the decision-making strategies should not be construed as steps that must proceed in a particular order. Additional steps may be added, some steps removed, or the order of the strategies altered. Further, the strategies may be given with certain threshold values or ranges (such as 60%, 65%, 70%, 75%, 80%, etc.). These threshold values are exemplary and may be increased, decreased, or provided in various ranges.

1. An ASR engine is recommended if its port utilization is lower than about 80% and the system CPU utilization is less than about 70%. In this strategy, any engine that is not heavily loaded will be used if the system running the speech application has available CPU power to process the results from the ASRs and combine them.

2. An ASR engine is recommended if it is among the top three ASR engines whose port utilization is lower than about 75%. In addition, the call handler utilization is less than about 60%. In this strategy, the system will select the top free ASR engines conditioned that they are not heavily loaded (75%). In addition, the system running the call control should be able to promptly handle calls (its call utilization is less than 60%).

The RPC 410 performs several functions. As one example, the RPC 410 mediates between the RMC 430, ASR engines or systems 60A, 60B, 60C, and combination components 420. Further, the RPC 410 can provide a common ASR engine interface to the speech enabled applications and platform 400 as if a single ASR engine is used.

The RPC 410 can be configured to operate in many different ways. The following examples illustrate possible configurations. These configurations are provided as examples and should not be construed to limit other configurations applicable with embodiments of the present invention. Further, the configurations should not be construed as steps that must proceed in a particular order. Additional steps may be added, some steps removed, or the order of the configuration altered.

1. When the speech enabled application 400 receives an input speech signal to be recognized, the signal is forwarded to the RPC 410 using a single ASR interface. For example, Media Resource Control Protocol (MRCP) can be used.
2. The RPC 410 consults the RMC 430 to decide on which ASR engine or engines to use.
3. The RMC 430 checks the system available resources and provides a decision about whether to use a single ASR engine or to use multiple ASR engines. If multiple engines are to be used, the RMC 430 decides which ASR engines to use.
4. If one ASR engine is to be used due to system resources constraints, the RPC 410 invokes the ASR engine and returns the recognized text to the application.
5. If multiple ASR engines are to be used, then the RPC 410 invokes the ASR engines and passes their results to the combination component (CC) 420.
6. The CC 420 performs the combination between ASR results according to a predefined combination strategy.
7. The RPC 410 obtains the combined results from the combination component and returns the final combined text (which will be more accurate than the output from single ASR) to the application.

The CC 420 can be configured to take the output from several speech recognition engines and combine the outputs to produce a more accurate (example, a lower word error rate) result. Different combination technologies can be utilized to produce the combined output. By way of example, these technologies include, but are not limited to, voting, two-engine combination, and predictive selection.

The following discussion illustrates an example of an IVR system utilizing an embodiment in accordance with FIG. 4. In this example, three ASR engines are used. For a set of calls (say 10,000 calls), the Word Error Rate (WER) for the ASR engines is 5%, 6.4%, and 8%. If a single engine is always used (one of the ASRs is picked at runtime) then the average WER for the system is $5 \times \frac{1}{3} + 6.4 \times \frac{1}{3} + 8 \times \frac{1}{3} = 6.47\%$ (assuming engines are treated equally).

In this example, calls do not come to the system all at the same time. During peak time, only one ASR engine will be used; otherwise, the three ASR engines will be used and their results are combined. Assume combination of three engines using a voting schema will lead to a 40% relative improvement in accuracy of the best performing engine (i.e., WER of a voting combiner is 3%). Then for various values of peak calls "P %", where P=10, 20, 30, a comparison is made of the overall WER for a system that invokes a single ASR (using the average WER of 6.47% as noted above) and for a system that uses the embodiment of FIG. 4. The results are shown in the following table.

| Call Distribution | P = 10% | | | P = 20% | | | P = 30% | | |
| --- | --- | --- | --- | --- | --- | --- | --- | --- | --- |
| | Peak | OffPeak | Total | Peak | OffPeak | Total | Peak | OffPeak | Total |
| Single ASR System | 6.47 | 6.47 | 6.47 | 6.47 | 6.47 | 6.47 | 6.47 | 6.47 | 6.47 |
| Example System of the Invention | 6.47 | 3 | 3.337 | 6.47 | 3 | 3.694 | 6.47 | 3 | 4.041 |

From above table, the system in accordance of the present invention has 48.4% relative improvement in accuracy for a system where peak calls are 10% of the time, and 42.9% when peak calls are 20% of the time, and 37.5% when peak calls are 30% of the times. The table thus illustrates that embodiments of the present invention can obtain improved accuracy without sacrificing response time.

As an example, the Resource Management Application may be a separate entity comprising the RPC 410, CC 420, and RMC 430. Alternatively, the Resource Management Application may be combined with the speech enabled application 400.

The Resource Management Application may be utilized, for example, in hardware, software, or combination. In one embodiment, for example, the Resource Management Application may comprise the RPC 410, CC 420, and RMC 430 in various components of software. The software implementation may be manifested as instructions, for example, encoded on a program storage medium that, when executed by a computer, perform some particular embodiment of the method and system in accordance with embodiments of the present invention. The program storage medium may be optical, such as an optical disk, or magnetic, such as a floppy disk, or other medium. The software implementation may also be manifested as a program computing device, such as a server programmed to perform some particular embodiment of the method and system in accordance with the present invention. Further, programs in each component need not necessarily communicate only to other components in a direct line, but each component may also include communications with other programs or components. Further, the three categories of software (RPC, CC, and RMC) do not require any definitive structure for the program or programs that perform the functions of the Resource Management Application. These three components are discussed as example embodiments to aid in conceptualizing operation of the Resource Management Application and various embodiments of the invention. Furthermore, the degree of autonomy and intelligence of the software components may vary. Some components may be purely reactive and perform tasks in response to messages, instructions, or data received, for example. Other components may be highly intelligent and may be proactive in performing their assigned tasks. Further, the components may be able to learn from the operative environment and may be able to communication with other programs, components, or devices (for example) to perform desired tasks. In accordance with embodiments, the components may be three components or less or more and may be intelligent components capable of autonomous, proactive, and software and hardware interactions.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of automatic speech recognition (ASR), comprising:
    receiving a speech utterance from a user;
    assessing resources, by a processor, by monitoring both port utilization and processing utilization of each of a plurality of different ASR engines to determine which of the plurality of different ASR engines are busy serving users;
    assigning the speech utterance to a single ASR engine when the plurality of different ASR engines are busy such that the port and processing utilizations are within a set of threshold values;
    assigning the speech utterance to the plurality of different ASR engines when the plurality of different ASR engines are not busy such that the port and processing utilizations are within another set of threshold values; and
    generating text of the speech utterance with either the single ASR engine or the plurality of different ASR engines;
    wherein assigning the speech utterance to a single engine if processing utilization is within a threshold value when the port utilization of the single ASR engine is lower than a port utilization threshold of 80%.

2. The method of claim 1 wherein assessing resources further comprises monitoring memory utilization and input/output utilization.

3. The method of claim 1 wherein assessing resources further comprises monitoring a number of users providing speech utterances.

4. An automatic speech recognition (ASR) system comprising:
    means for processing a digital input signal from an utterance of a user;
    means for evaluating resources of the ASR system to determine whether the ASR system is busy processing utterances of users by monitoring port utilization and available processing power of each of a group of ASR engines; and
    means for selecting between a single ASR engine and the group of ASR engines to recognize the utterance of the user, wherein the selecting means utilizes the evaluation of resources to select the single ASR engine when the port utilization and available processing power are within a set of threshold values and the ASR system is busy processing the utterances of the users and to select the group of ASR engines when the port utilization and available processing power are within another set of threshold values and the ASR system is not busy processing the utterances of the users;
    wherein selecting the group of ASR engines to recognize the utterance of the user if available processing power is within a threshold value when the port utilization of two ASR engines is lower than a predefined threshold of 75%.

5. The ASR system of claim 4 further comprising a means for combining results of ASR engines if the group of ASR engines is selected, the group of ASR engines being adapted to provide a more accurate recognition of the utterance than a single ASR engine.

6. The ASR system of claim 4 wherein the means for evaluating resources of the system evaluates resources to simultaneously run multiple ASR engines.

7. The ASR system of claim 4 wherein the means for evaluating resources of the system evaluates ASR ports, system resources, and call handlers.

8. A system, comprising:
    a computer system comprising a central processing unit coupled to a memory and resource management application; and
    a plurality of different automatic speech recognition (ASR) engines coupled to the computer system, wherein the resource management application assesses resources being used by each of the plurality of different ASR engines by monitoring port utilization and available processing power of each of the plurality of different ASR engines, and the computer system select a single ASR engine to analyze a speech utterance when the system is busy such that the port utilization and the available processing power are within a set of threshold values and selects multiple ASR engines to analyze the speech utterance when the system is not busy such that the port utilization and the available processing power are within another set of threshold values;
    wherein selecting a single ASR engine to analyze the speech utterance if available processing power is within a threshold value when the port utilization of the single ASR engine is lower than a port utilization of 80%.

9. The system of claim 8 wherein the computer system selects an ASR engine that has most available resources.

10. The system of claim 8 further comprising a telephone network comprising at least one switching service point coupled to the computer system.

11. The system of claim 10 further comprising at least one communication device in communication with the switching service point to provide the speech utterance.

12. The system of claim 8 wherein the resource management application comprises a recognition proxy component and a resource monitoring component.

13. The system of claim 12 wherein the resource management component collects and analyzes information about the resources available on the system.

14. The system of claim 13 wherein the resource monitoring component mediates between the plurality of ASR engines and the resource management component.

* * * * *

UNITED STATES PATENT AND TRADEMARK OFFICE
CERTIFICATE OF CORRECTION

PATENT NO. : 7,917,364 B2  
APPLICATION NO. : 10/668141  
DATED : March 29, 2011  
INVENTOR(S) : Sherif Yacoub Page 1 of 1

It is certified that error appears in the above-identified patent and that said Letters Patent is hereby corrected as shown below:

In column 10, line 34, in Claim 8, delete "select" and insert -- selects --, therefor.

Signed and Sealed this
Twenty-seventh Day of December, 2011

David J. Kappos
*Director of the United States Patent and Trademark Office*